US006860476B2

(12) United States Patent
Cassese

(10) Patent No.: US 6,860,476 B2
(45) Date of Patent: Mar. 1, 2005

(54) DEVICE FOR CLAMPING MOULDINGS FOR FRAME ASSEMBLING MACHINES

(75) Inventor: Antoine Cassese, St Germain Laxis (FR)

(73) Assignee: Cassese S.A., L'Etang (FR)

( * ) Notice: Subject to any disclaimer, the term of this patent is extended or adjusted under 35 U.S.C. 154(b) by 0 days.

(21) Appl. No.: 10/432,370

(22) PCT Filed: Nov. 19, 2001

(86) PCT No.: PCT/FR01/03621

§ 371 (c)(1),
(2), (4) Date: Sep. 30, 2003

(87) PCT Pub. No.: WO02/42036

PCT Pub. Date: May 30, 2002

(65) Prior Publication Data

US 2004/0056404 A1 Mar. 25, 2004

(30) Foreign Application Priority Data

Nov. 23, 2000 (FR) ........................................... 00 15104

(51) Int. Cl.[7] .................................................. B23Q 3/00
(52) U.S. Cl. .......................................... 269/305; 269/45
(58) Field of Search ............................ 269/305, 289 R, 269/41, 45, 124, 910

(56) References Cited

U.S. PATENT DOCUMENTS

| | | | | |
|---|---|---|---|---|
| 2,744,430 A | * | 5/1956 | Keahey et al. | 269/137 |
| 2,936,803 A | * | 5/1960 | Jorick, Jr. | 269/45 |
| 4,881,726 A | * | 11/1989 | Jolkovski | 269/41 |
| 6,286,823 B1 | * | 9/2001 | Morghen | 269/47 |
| 6,694,851 B2 | * | 2/2004 | Erisoty | 83/767 |

* cited by examiner

*Primary Examiner*—Lee D. Wilson
(74) *Attorney, Agent, or Firm*—Finnegan, Henderson, Farabow, Garrett & Dunner, L.L.P.

(57) ABSTRACT

A clamping device for clamping mouldings for a frame assembling machine having a mobile plate (4) that carries a straight sliding clamp (6), returned by a spring and rotary clamp (7), each adapted to engage one of two mouldings to be clamped and assembled. The sliding clamp (6) is fixed to a jib (8) which extends beneath the mobile plate (4). The rotary clamp (7) is integral with a spindle (9) passing through the mobile plate and which bears in its lower part a lever (10) extending towards the jib (8) whereto it is fixed by an anchoring pin (11).

3 Claims, 2 Drawing Sheets

DEVICE FOR CLAMPING MOULDINGS FOR FRAME ASSEMBLING MACHINES

BACKGROUND OF THE INVENTION

The invention relates to a device for clamping mouldings prior to stapling, in a frame assembling machine.

The frames designed to surround pictures are known to be manufactured from framing strips, beads or mouldings by cutting the latter to a mitre shape for subsequent assembly. To assemble these mouldings, use is advantageously made of a staple formed of a metallic strip bent in two in the vicinity of its median part, one of the horizontal edges of which has a bevelled part formed from the internal face of the staple and the vertical edges of which are bent back outwardly in the direction of the bending axis.

For stapling properly speaking, there is known a machine comprising a table with a 90° notch on its forward face, and means for applying the mitre faces of the framing strips against one another under pressure.

More precisely, these means are constituted by a mobile plate, the front part of which forms a 90° angle so that its faces move parallel to those of the notch, as well as two claws borne by said plate the role of which is, when the plate is moved forward, to exert a pressure against the mouldings and to clamp them in this way against one another and against stops, prior to stapling properly speaking. One of the claws is slideable on the mobile plate, and return biased by a pressure spring. The other claw, which is also return biased by a spring, is pivotable on the plate and its pivoting movement is produced in the direction of clamping of a moulding, when the plate itself moves forward, thanks to a projection serving as a stop.

It is thus the movement of the mobile plate in the direction of the table bearing the mouldings that causes the action of the claws by translation or rotation. The return springs of the claws therefore have to be calibrated correctly so that the pressure that they exert on the mouldings is sufficient but not excessive, and these calibration operations prove to be quite a delicate matter. The Applicant has also noted that the pressure that the pivoting claw could exert can vary according to the dimension of the mouldings and the distance that can be given to the mobile plate in relation to the fixed table, since the clamping of this pivoting claw is linked to the advance of said plate.

SUMMARY OF THE INVENTION

To avoid these drawbacks and to make these positioning and clamping operations easier, the Applicant has developed a system with claws which act only when they are placed in abutment against the mouldings, and no longer as soon as the displacement movement of the mobile plate occurs, The main object of the invention is thus a device for clamping mouldings for frame assembling machines including a fixed clamping table bearing stops forming between them an angle of approximately 90°, and a plate that is mobile in the direction of the stops, on which are mounted a straight sliding claw biased by a spring, as well as a rotary claw, each capable of engaging one of the two mouldings to be stapled, a device wherein connecting members, connected to the mobile plate, connect together the sliding claw and the rotary claw, to slave the rotation of the rotary claw to the translation movement of the sliding claw.

More precisely, the connecting members are constituted by a jib to which the sliding claw is fixed, and by a lever integral with the rotary claw and which extends in the direction of the jib to which it is fixed by an anchoring pin.

BRIEF DESCRIPTION OF THE DRAWINGS

Other particular characteristics and advantages of the invention will emerge from the description that follows of an exemplary form of embodiment in which reference is made to the annexed drawings, which represent.

DETAILED DESCRIPTION OF THE INVENTION

Figure 1:
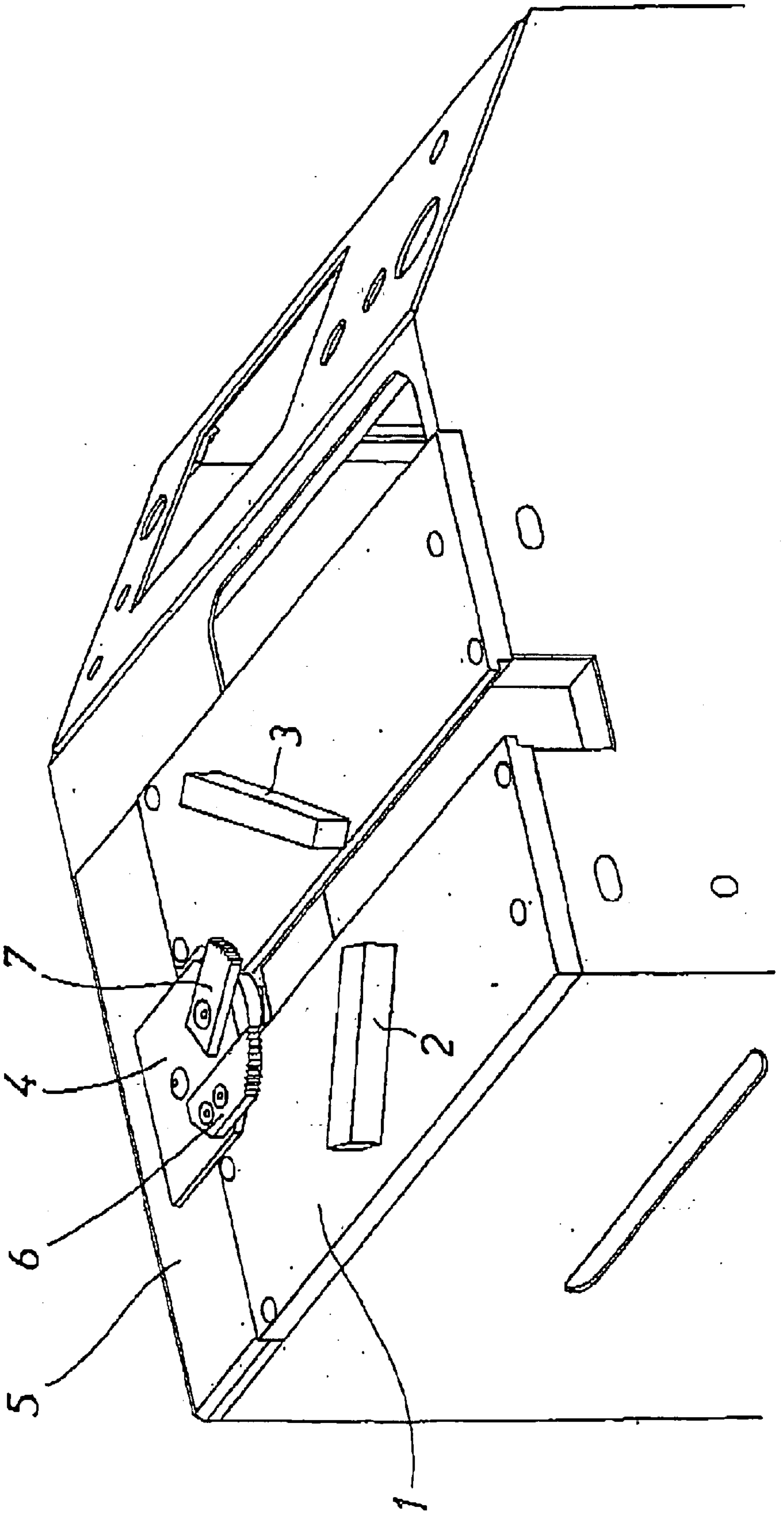
FIG. 1, an overall perspective view of a clamping table.

FIG. 1 shows a fixed stapling table 1 bearing stops 2 and 3 forming between them an angle of approximately 90° and the inclination and spacing of which can be adjusted by conventional mechanisms, not shown. A mobile plate 4 connected to a mobile bar 5, incorporating a jack, not shown, is capable of moving in the direction of the stops (2, 3). On top of plate 4 are mounted a straight sliding claw 6 and a rotary claw 7, each capable of engaging one of the two mouldings to be stapled.

Figure 2:
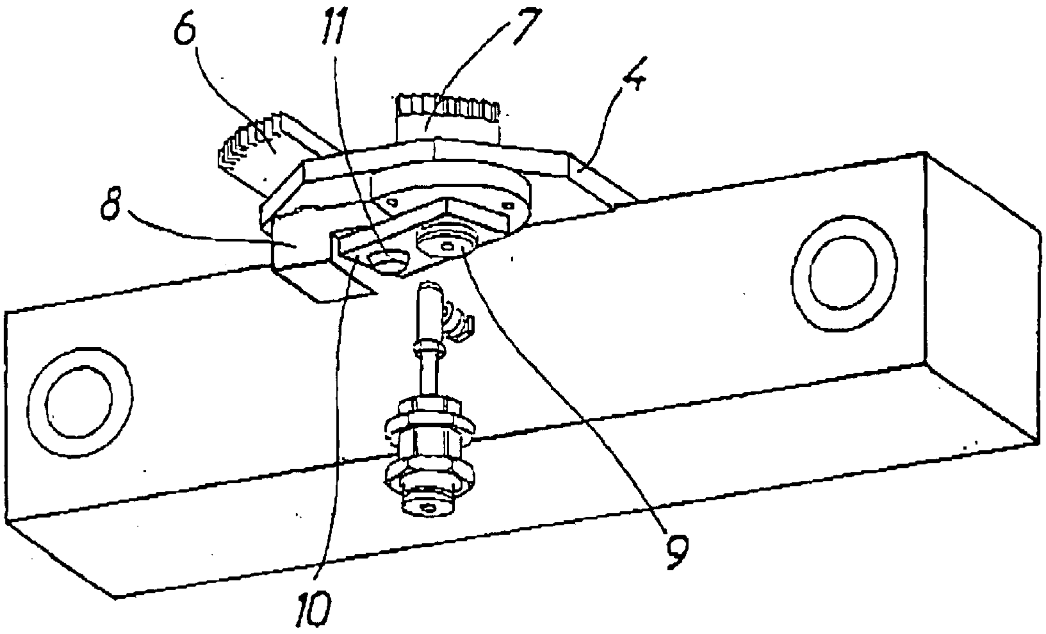
FIG. 2, a perspective view of the underneath of the mobile plate.
Figure 3:
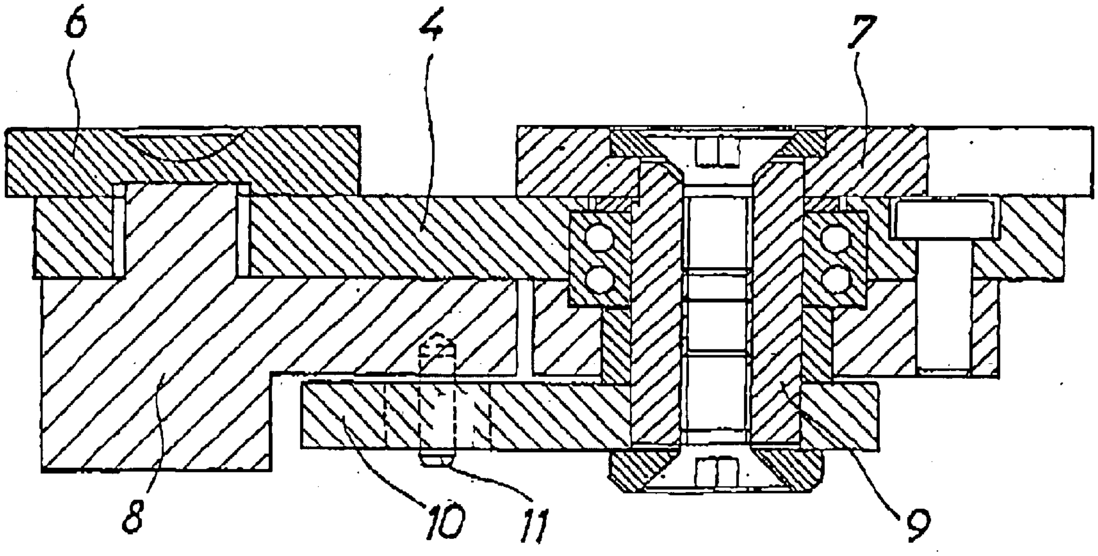
FIG. 3, a vertical cross-sectional view, on a larger scale, of the mobile plate.

It can b seen more precisely in FIGS. 2 and 3 that the straight sliding claw 6 is fixed to a jib 8 which extends beneath mobile plate 4. On the other hand, rotary claw 7 is integral with a spindle 9 which passes through the mobile plate and which bears, on its lower part, a lever 10 extending in the direction of jib 8, to which it is fixed by an anchoring pin 11.

When the mouldings are in place against stops 2 and 3, the mobile plate is operated to move towards them. As soon as straight claw 6 has reached the corresponding moulding, it ceases to move and the continued advance of plate 4 will cause the pivoting of jib 8, which, via pin 11, will cause lever 10 to rotate about spindle 9, as well as rotary claw 7 which is integral therewith. Through the effect of this pivoting, the rotary claw will, itself, press against the other moulding, in a movement thus directly slaved to the translation movement of the sliding claw. According to the calibration of the return spring of the sliding claw and the general pressure of the claws provided by the jack of the mobile plate, the positions of the mouldings will be more finely adjusted to ensure perfect matching of the profiles of the two mitre cuts prior to stapling.

This proportionality between the rotation of the rotary claw and the setting back of the sliding claw in relation to the plate, thanks to the connecting means described above, facilitates the automatic positioning and clamping of the mouldings, prior to the stapling operations that are carried out in a conventional manner.

What is claimed is:

1. A clamping device for clamping moldings for a frame assembly machine, said clamping device comprising a fixed clamping table having bearing stops forming between them an angle of approximately 90°, a mobile plate mounted on the table for movement in a direction toward the stops, a straight sliding claw biased by a spring, and a rotary claw both of which are mounted on the plate, each of said claws being capable of engaging one of two mouldings to be clamped for assembly, connecting members connected to the mobile plate that connect together the sliding claw and the rotary claw, to slave rotation of the rotary claw to translation movement of the sliding claw.

2. The clamping device according to claim 1, wherein the connecting members include a jib to which the sliding claw is fixed, and a lever integral with the rotary claw and which extends in the direction of the jib.

3. The clamping device according to claim 2, wherein the lever is fixed to the jib by an anchoring pin.

* * * * *